(12) United States Patent
Blanton et al.

(10) Patent No.: US 7,749,927 B2
(45) Date of Patent: Jul. 6, 2010

(54) TETHERED CORNERS AND FLANGES AND ARTICLES COMPRISING THE SAME

(75) Inventors: Lee Alan Blanton, Cincinnati, OH (US); Curt Brian Curtis, West Chester, OH (US); Frank Worthoff, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/646,024

(22) Filed: Dec. 27, 2006

(65) Prior Publication Data

US 2008/0160314 A1     Jul. 3, 2008

(51) Int. Cl.
*B32B 5/26* (2006.01)
(52) U.S. Cl. .................. 442/381; 442/415; 428/292.1
(58) Field of Classification Search ........... 428/292.1; 442/381, 415
See application file for complete search history.

(56) References Cited

U.S. PATENT DOCUMENTS

| | | | | |
|---|---|---|---|---|
| 5,567,500 A | * | 10/1996 | Marshall et al. ............. | 428/116 |
| 6,096,669 A | * | 8/2000 | Colegrove et al. .......... | 442/366 |
| 6,231,941 B1 | * | 5/2001 | Cundiff et al. ............. | 428/36.3 |
| 6,709,538 B2 | * | 3/2004 | George et al. .............. | 156/73.3 |

FOREIGN PATENT DOCUMENTS

WO    WO 2004/078465 A1  *  9/2004

* cited by examiner

*Primary Examiner*—Norca L Torres-Velazquez
(74) *Attorney, Agent, or Firm*—Bryn T. Lorentz; William Scott Andes; General Electric Company

(57) ABSTRACT

Tethered flange corners including at least one ply of barrier fibers and at least one fiber tow wrapped about the barrier fibers. Also included are flanges having a tethered corner containing at least one ply of barrier fibers, at least one fiber tow wrapped about the barrier fibers, at least one ply of filler fibers applied over the fiber tow, and at least one ply of flange fibers applied over the filler fibers. Additionally included are articles incorporating a composite structure having a flange with a tethered corner containing at least one ply of barrier fibers and at least one fiber tow wrapped about the barrier fibers.

19 Claims, 5 Drawing Sheets

TETHERED CORNERS AND FLANGES AND ARTICLES COMPRISING THE SAME

TECHNICAL FIELD

Embodiments described herein generally relate to tethered corners and flanges and articles comprising the same. More particularly, embodiments herein generally describe tethered corners that can help eliminate the occurrence of bridging of composite materials during flange layup and cure.

BACKGROUND OF THE INVENTION

In recent years composite materials have become increasingly popular for use in a variety of aerospace applications because of their durability and relative lightweight. Although composite materials can provide superior strength and weight properties, designing flanges on structures fabricated from composite materials still remains a challenge.

Current flange lay-up processes can generally involve repeatedly applying plies, or layers, of fabric to a composite structure until a flange having the desired dimensions is obtained. One issue that can arise during this process is that when a second ply of fabric is applied, it can cover the first ply of fabric, thereby making it nearly impossible to monitor the first ply to ensure its placement is unchanged. As a result, bridging of the fabric may occur.

Bridging is when the initial, or first, fabric ply pulls away from the flange corner and spans across the corner rather than remaining tightly adhered thereto. Bridging may result in resin richness, which is an undesired agglomeration of excess resin beneath the first ply of fabric that can locally weaken the laminate.

Bridging may be caused by any of several factors. For example, bridging may result from inadequately placing the initial fabric plies into the corner of the flange such that as subsequent plies are applied during lay-up the initial plies may be jostled causing bridging. Also, inadequately removing bulk from the fabric plies during layup can result in an excess length of composite material, which can lead to bridging during the curing process. Additionally, bridging may result from differences in thermal expansion of the tooling versus the fabric during the curing process.

Regardless of the cause, there is currently no way for operators to easily monitor the initial fabric ply once it has been covered to help ensure that bridging is prevented and that the first ply of fabric remains adhered in the flange corner. The best current practice is to terminate the fabric plies at the corner to allow fabric slippage. However, this practice is generally only beneficial in addressing the issue of differences in thermal expansion during cure and does nothing to prevent bridging that occurs as a result of jostling or inadequate bulk removal.

Accordingly, it would be desirable to produce a composite flange that is less susceptible to bridging and the previously described fabrication concerns.

BRIEF DESCRIPTION OF THE INVENTION

Embodiments herein generally relate to tethered flange corners comprising at least one ply of barrier fibers and at least one fiber tow wrapped about the barrier fibers.

Embodiments herein also generally relate to flanges having a tethered corner comprising at least one ply of barrier fibers, at least one fiber tow wrapped about the barrier fibers, at least one ply of filler fibers applied over the fiber tow, and at least one ply of flange fibers applied over the filler fibers.

Embodiments herein also generally relate to articles comprising a composite structure including a flange having a tethered corner comprising at least one ply of barrier fibers and at least one fiber tow wrapped about the barrier fibers.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to tethered corners, as well as flange and articles comprising the same that can help eliminate the occurrence of bridging during flange layup and cure. While embodiments herein may generally focus on composite flanges on fan casings of gas turbine engines, it will be understood by those skilled in the art that the description should not be limited to such. Indeed, as the following description explains, the tethered flange corners described herein may be utilized on any flange fabricated from composite materials.

Figure 1:
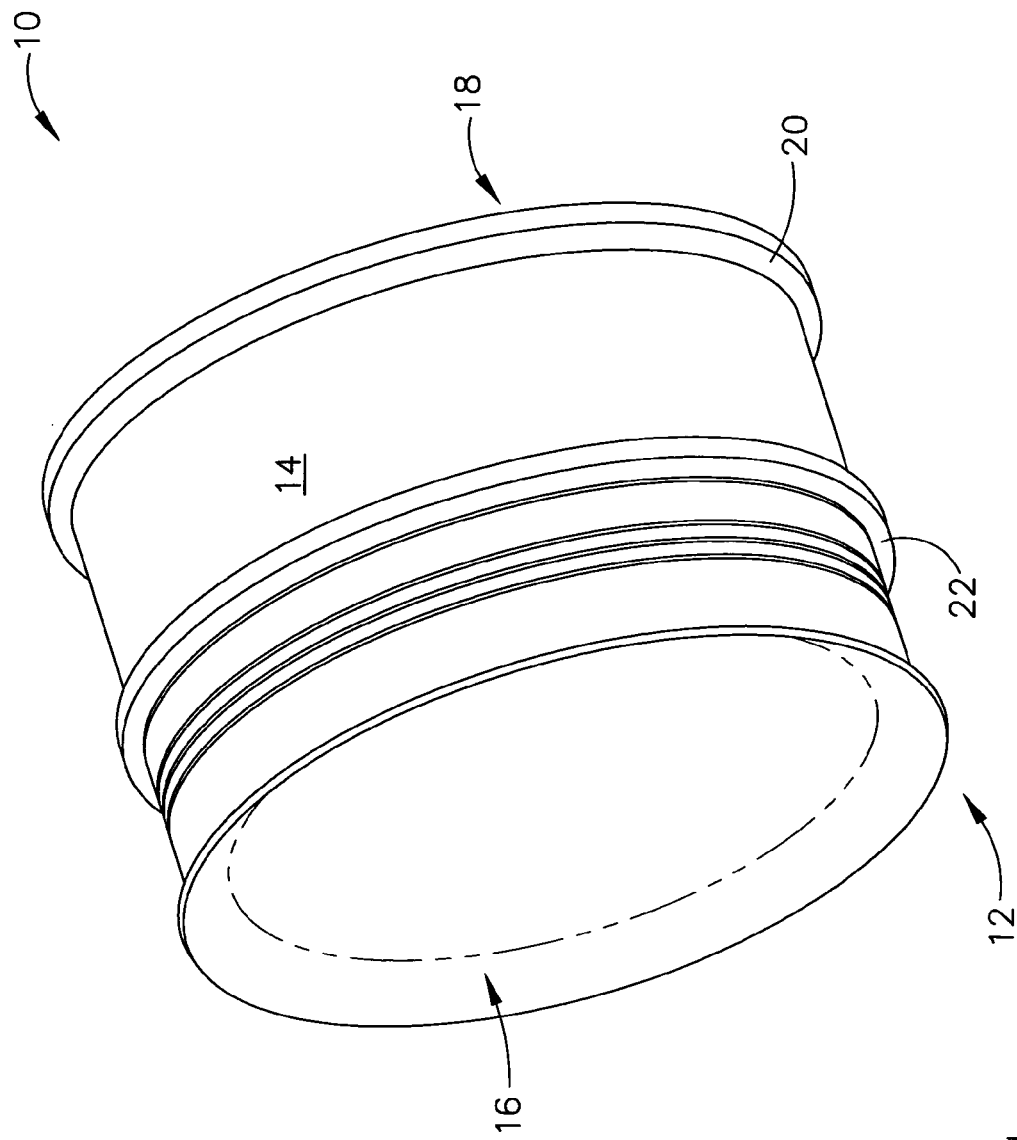
FIG. 1 is a schematic perspective view of one embodiment of a fan casing having end flanges and a mounting flange.
Figure 2:
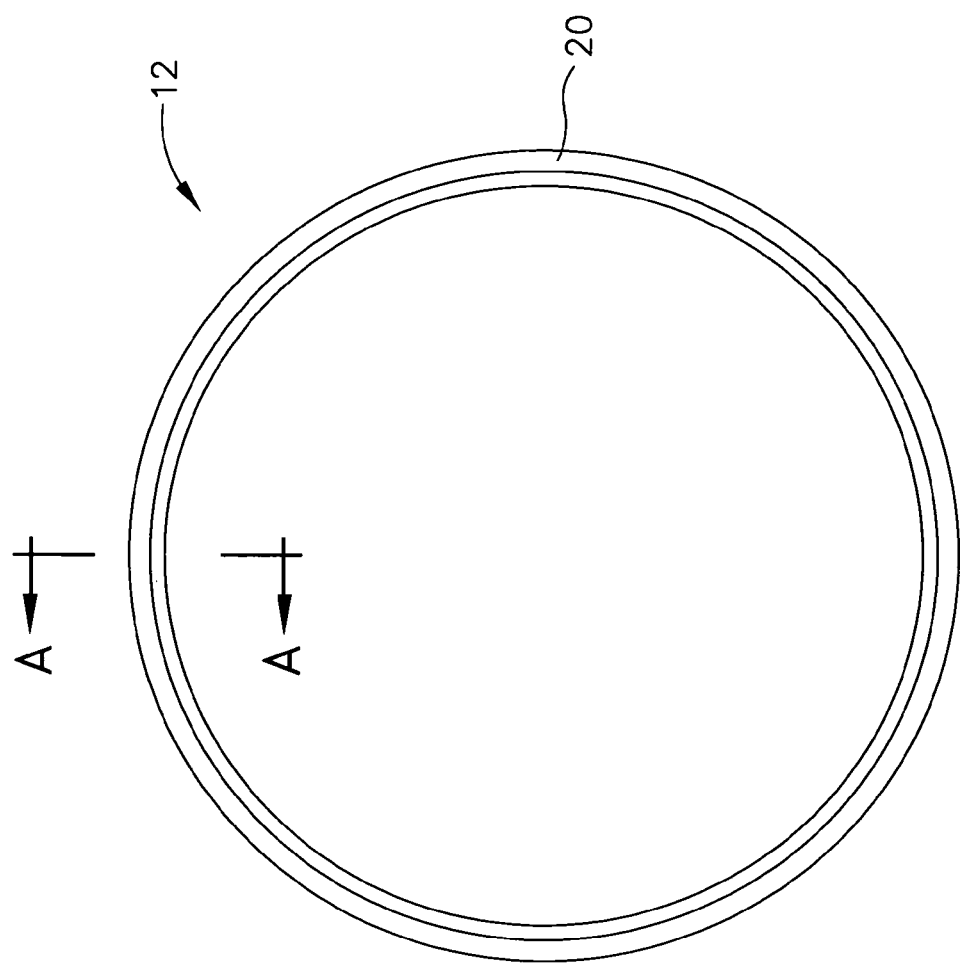
FIG. 2 is a schematic end view of FIG. 1.

Turning to the figures, FIG. 1 illustrates one embodiment of an acceptable composite structure 10. As used herein, "composite structure" refers to any component fabricated from a composite material or combination of composite materials. Composite structure 10 may comprise a generally cylindrical member, such as fan casing 12. Fan casing 12 may have a circumference, as shown in FIG. 2, and as previously mentioned may be fabricated from any acceptable material. In one embodiment, however, fan casing 12 may be fabricated from a material selected from the group consisting of glass fibers, graphite fibers, carbon fibers, ceramic fibers, aromatic polyamide fibers such as poly(p-phenylenetherephtalamide) fibers (i.e. KEVLAR®), and combinations thereof. In one embodiment, fan casing 12 may be fabricated from carbon fibers.

As shown in FIG. 1, fan casing 12 may generally comprise a cylindrical body 14 having a forward end 16 and an aft end 18. As used herein, "fan casing" is used to refer to both pre- and post-cure composite fan casings. Those skilled in the art will understand which stage is being referenced from the present description. Fan casing 12 may also comprise any number of end flanges 20, as shown generally in FIGS. 1 and 2, and/or mounting flanges 22, as shown generally in FIG. 1. As used herein, "mounting flange" refers to any flange interposed circumferentially about body 14 of fan casing 12, or other composite structure. By "interposed" it is meant that mounting flange 22 may be located circumferentially about body 14 of fan casing 12, as opposed to about either of forward end 16 or aft end 18. In contrast, end flange 20 may be located about either or both of forward end 16 or aft end 18.

Figure 3:
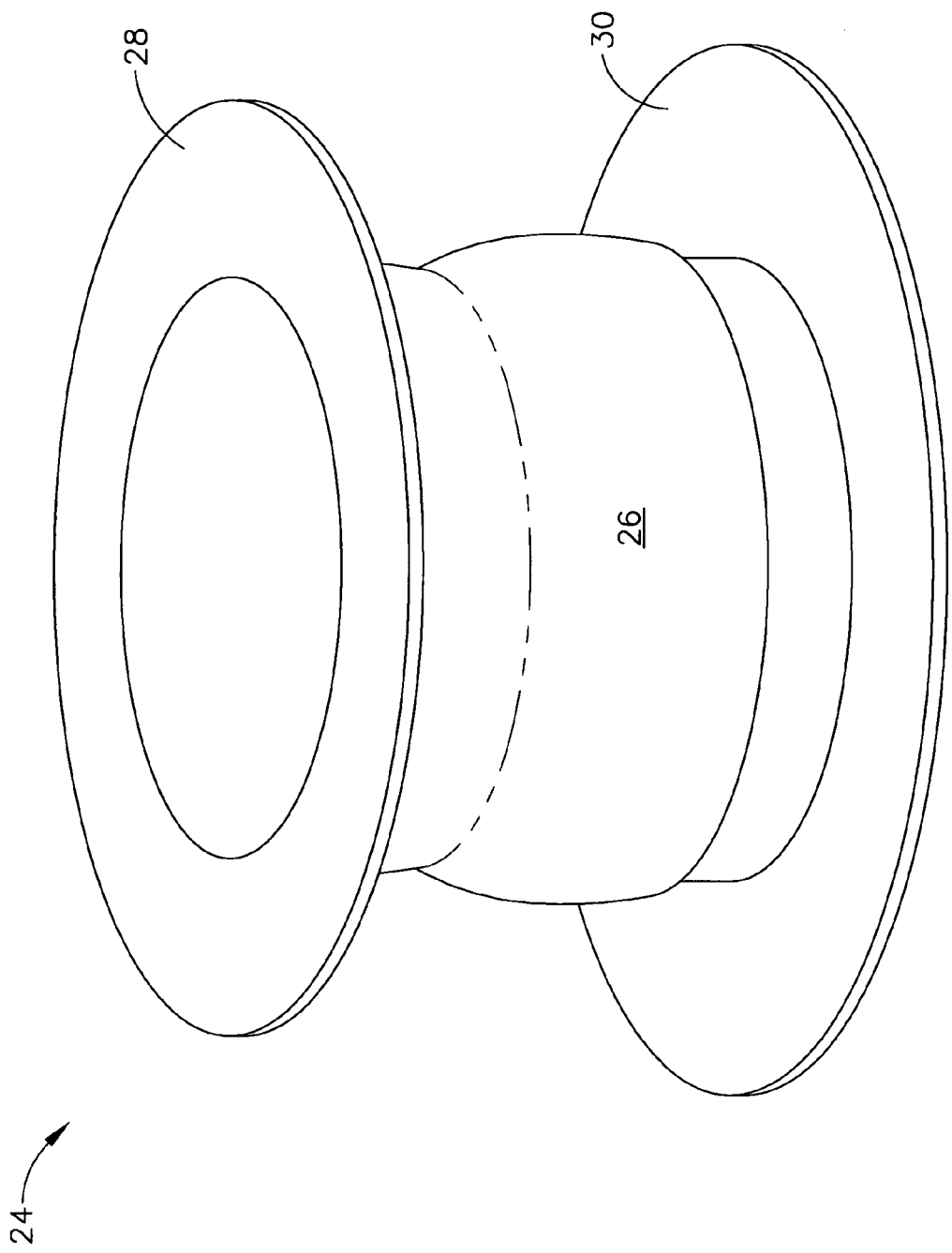
FIG. 3 is a schematic perspective view of one embodiment of a composite structure forming tool.

Fan casing 12 may be fabricated using any acceptable fabrication method or tooling known to those skilled in the art. See, for example, U.S. Patent Application Nos. 2006/0201135 to Xie et al., and 2006/0134251 to Blanton et al. In one embodiment, as shown in FIG. 3, a composite structure forming tool 24 may be used, which has a circumference, a generally cylindrically shaped core 26, as well as a first endplate 28 and a second endplate 30 that may be removeably coupled to core 26 of tool 24.

Figure 4:
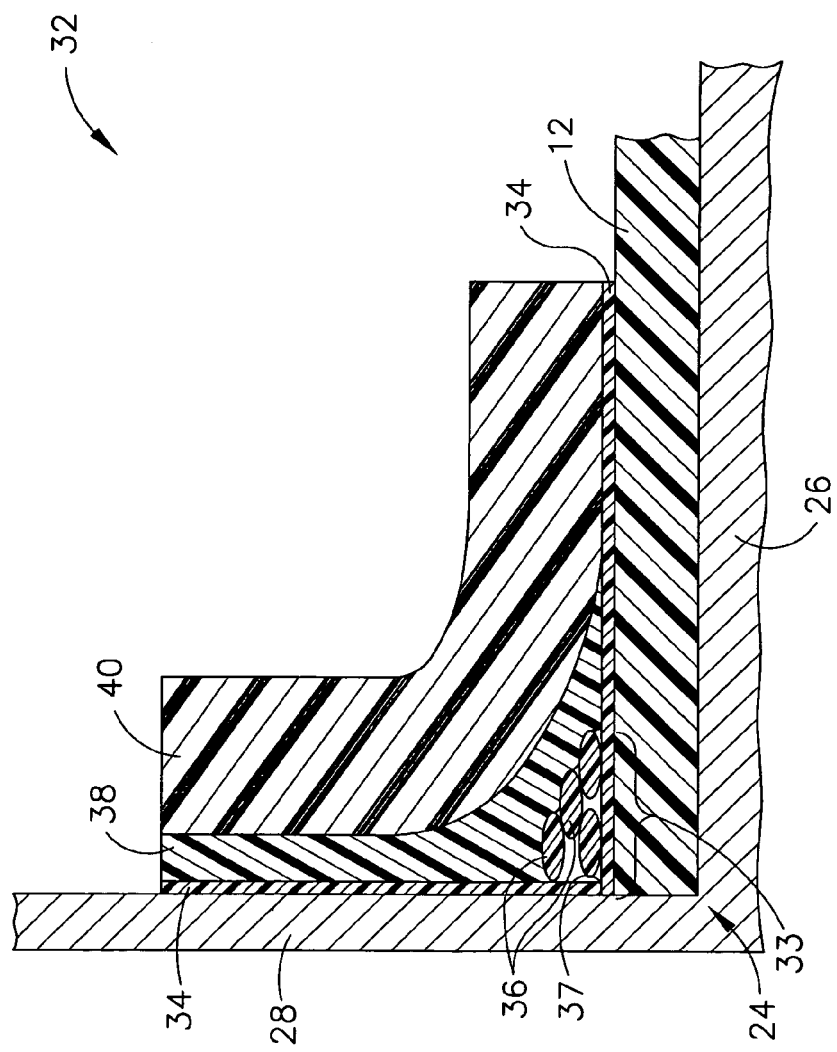
FIG. 4 is a schematic cross-sectional view of FIG. 2 along line A-A.

In FIG. 4 an illustrative embodiment of an end flange preform 32 is shown on fan casing 12. It will be understood by those skilled in the art that the following flange and lay-up descriptions may be equally applicable to mounting flanges. End flange preform 32 may include a tethered flange corner 33 which can help anchor flange preform 32 in place during layup and cure. Tethered flange corner 33 may comprise at least one ply of barrier fibers 34 and at least one fiber tow 36 wrapped circumferentially thereabout, as described herein below.

More specifically, tethered corner flange may generally include at least one ply of barrier fibers 34 applied adjacent to first endplate 28 of tool 24 and fan casing 12, for example. Barrier fibers 34 may be comprised of multidirectional textile performs such as weaves or braids. As used herein, "multidirectional" refers to textile preforms comprising fiber tows oriented in more than one direction. Fiber tows of barrier fibers 34 may be comprised of any suitable reinforcing fiber known to those skilled in the art, including, but not limited to, glass fibers, graphite fibers, carbon fibers, ceramic fibers, aromatic polyamide fibers, and combinations thereof. In one embodiment, barrier fibers 34 may be comprised of glass fibers. Additionally, each fiber tow of barrier fibers 34 may comprise from about 3000 to about 24,000 fiber filaments.

Barrier fibers 34 may be applied in flange corner 37 adjacent to first endplate 28 of tool 24 and fan casing 12 by wrapping barrier fibers 34 circumferentially about tool 24 and fan casing 12 until the desired thickness is obtained. If so desired, barrier fibers 34 may be tackified initially and upon completion of application to fan casing 12 to hold barrier fibers 34 in place. Any acceptable resin known to those skilled in the art may be used to tackify barrier fibers 34, such as epoxy, for example.

Next, at least one individual fiber tow 36 may be wrapped circumferentially about fan casing 12 over barrier fibers 34 in flange corner 37. In this way, fiber tow 36 can complete tethered flange corner 33 and help secure barrier fibers 34 in the desired location. While fiber tow 36 may be wrapped about the circumference of fan casing 12 any number of times, in one embodiment, fiber tow 36 may be wrapped from about 3 to about 6 times about the circumference of fan casing 12. Alternately, more than one fiber tow 36 may be wrapped about fan casing 12 one or more times to achieve the same result. Fiber tow 36 may be fabricated from any acceptable material known to those skilled in the art including, but not limited to glass fibers, graphite fibers, carbon fibers, ceramic fibers, aromatic polyamide fibers, and combinations thereof. However, in one embodiment, fiber tow 36 may be fabricated from carbon fibers. Additionally, each fiber tow 36 utilized may comprise from about 3000 to about 24,000 fiber filaments, and in one embodiment, about 12,000 fiber filaments. Once fiber tow 36 is securely wrapped about barrier fibers 34 of tethered flange corner 33 it may be tackified using any acceptable resin known to those skilled in the art, for example, epoxy, to hold it in place during the fabrication of the remainder of end flange preform 32.

At least one ply of filler fibers 38 may then be applied over fiber tow 36 to help fill in any space that may be present between tethered flange corner 33 and the flange fibers that will be subsequently applied. Similar to barrier fibers 34, a ply of filler fibers 38 may be a multidirectional textile preform comprised of any suitable reinforcing fiber known to those skilled in the art, including, but not limited to, glass fibers, graphite fibers, carbon fibers, ceramic fibers, aromatic polyamide fibers, and combinations thereof. Also similar to barrier fibers 34, filler fibers may be wrapped about the circumference of fan casing 12, adjacent to first endplate 28 and over barrier fibers 34 and fiber tow 36 until the desired thickness is obtained. If necessary, filler fibers 38 may be tackified using any acceptable resin known to those skilled in the art to help hold filler fibers 38 in place throughout the rest of the fabrication process.

Flange fibers 40 may then be applied over filler fibers 38 using any known flange fabrication method known in the art to complete fabrication of end flange preform 32. Once again, flange fibers may comprise any suitable material such as glass fibers, graphite fibers, carbon fibers, ceramic fibers, aromatic polyamide fibers, and combinations thereof that can be wound about tool 24 over filler fibers 38.

To consolidate end flange preform 32, a debulking step may be performed. In particular, reinforcing fibers, such as barrier fibers 34, filler fibers 38 and flange fibers 40 may inherently have a substantial amount of bulk. In order to help prevent wrinkles and/or voids during the final cure of the material, and to utilize near net shape tooling during the final cure, the fibers of the material can be consolidated, or compressed, into a dimension that is closer to the desired final cured thickness. This consolidation occurs during debulk.

Debulk can be carried out using any common method known to those skilled in the art, such as, for example, by applying pressure to the composite fibers with either a vacuum bag, shrink tape, or other mechanical means. Resin applied to the fibers before debulk can help tack, or lock, the fibers in place once the pressure is applied. If the tackified fibers cannot be consolidated as desired at room temperature, then heat may be applied to lower the viscosity of the resin. The resin may then better infiltrate the composite fibers and allowing the consolidation to be carried out to the desired degree.

Having finished laying up and debulking end flange preform 32, final cure tooling can be placed about fan casing 12, including any end flange performs and mounting flange performs, to serve as a mold during the curing process. As will be understood by those skilled in the art, the final cure tooling and process may vary according to such factors as resin used, part geometry, and equipment capability.

Figure 5:
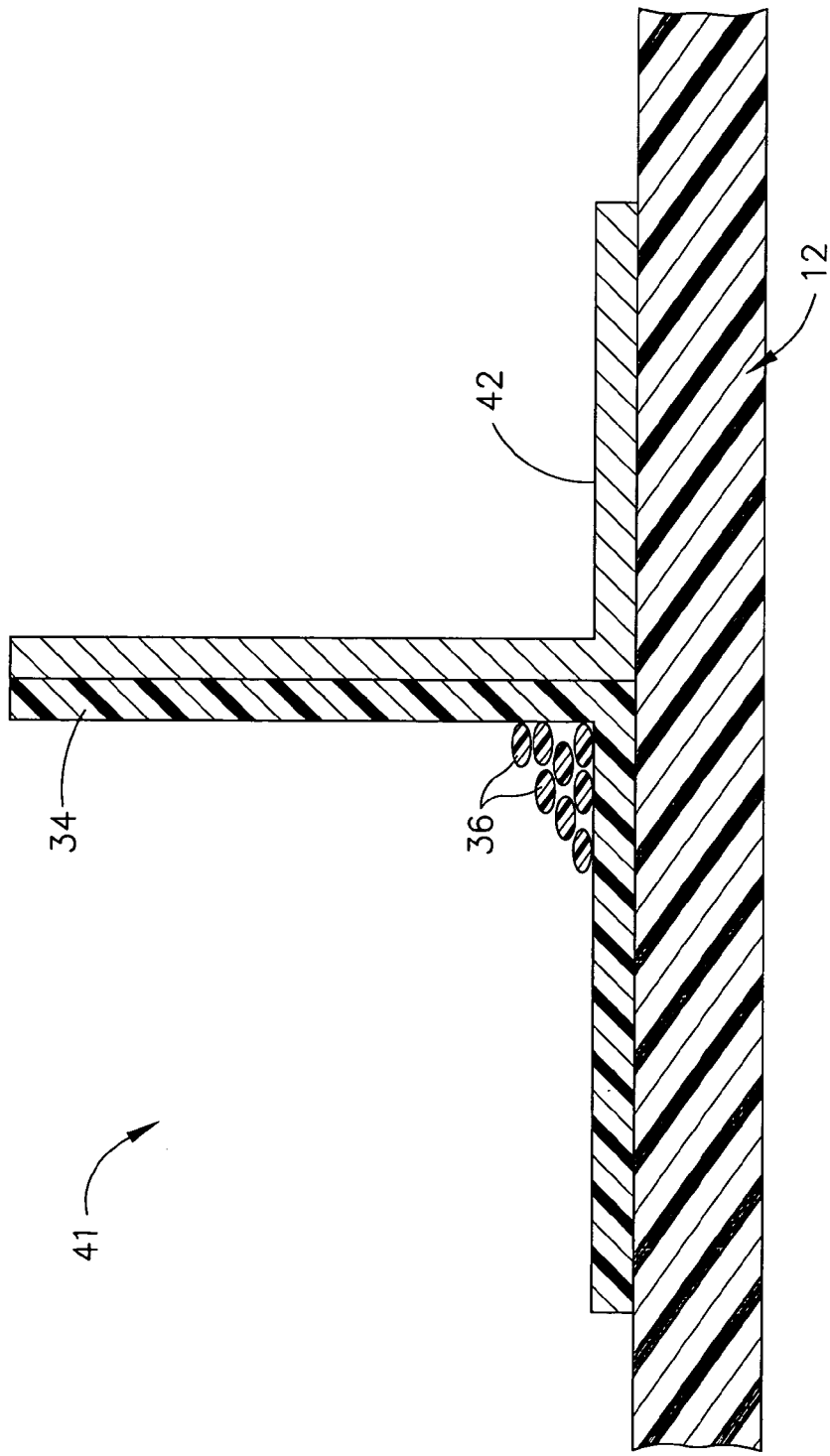
FIG. 5 is a schematic cross-sectional view of one embodiment of a fan casing with a guide for fabricating a mounting flange having tethered corners.

As previously described, the foregoing is equally applicable to mounting flanges as well as end flanges. When fabricating a mounting flange preform 41, which is located about the body of fan casing 12, a guide 42 may be used in place of first or second endplate to provide a surface against which to apply barrier fibers 34 and fiber tow 36, as shown generally in FIG. 5. In one embodiment, guide 42 may be comprised of discrete arcuate members, each spanning about 180 degrees so as to fit correspondingly about fan casing 12. The arcs of guide 42 may be releaseably connected together for easy placement and adjustment about fan casing 12. It will be understood, however, that guide 42 may be comprised of any number of pieces and have any shape that corresponds to the shape of the composite structure. As previously discussed, guide 42 can serve as a support for the application of both barrier fibers 34 and fiber tow 36, as well as the remaining fiber layers of the flange preform 41. Guide 42 may be circumferential and have an L-shaped cross-section as shown, and may be constructed from any rigid, lightweight material such as, for example, aluminum or composite. Once one side of mounting flange preform 41 is constructed, as shown in FIG. 5, guide 42 may be removed. The other side of mounting flange preform 41 may then be constructed in the same manner as the first side.

Embodiments of the tethered corner described herein can provide several benefits. For example, applying the fiber tow about the barrier fibers allows the fiber tow to serve as a tether to hold the barrier fibers in the corner of the flange during subsequent lay-up steps. More specifically, as additional plies of filler fibers and/or flange fibers are placed and jostled, the barrier fibers stay tethered in the corner because of the wrapped fiber tow. This can help reduce or even eliminate the bridging issue often faced in current flange fabrication processes.

Additionally, during curing, the composite structure forming tool endplate and core have a tendency to expand and pull away from one another due to the heat and pressure of the curing process. This in turn can cause the barrier fibers to be pulled out of the corner and result in bridging. The tethered corner created by the fiber tow can help address this issue in two ways. First, the tethered corner can reduce the occurrence of bridging in the first instance by helping to hold the barrier fibers taught. Second, during the curing process, the previously described expansion of the composite structure forming tool can tighten the fiber tow of the tethered corner, thereby effectively pulling it and the barrier fibers against one another in the desired orientation and reinforcing the adhesion therebetween.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tethered flange corner comprising:
   at least one ply of barrier fibers comprising a multidirectional fiber preform; and
   at least one fiber tow wrapped circumferentially about the barrier fibers to produce the tethered flange corner.

2. The tethered flange corner of claim 1 wherein the barrier fibers are comprised of a material selected from the group consisting of glass fibers, graphite fibers, carbon fibers, ceramic fibers, aromatic polyamide fibers, and combinations thereof.

3. The tethered flange corner of claim 1 wherein the fiber tow is comprised of a material selected from the group consisting of glass fibers, graphite fibers, carbon fibers, ceramic fibers, aromatic polyamide fibers, and combinations thereof.

4. The tethered flange corner of claim 1 wherein the barrier fibers comprise glass fibers.

5. The tethered flange corner of claim 1 wherein the fiber tow comprises carbon fiber.

6. The tethered flange corner of claim 1 wherein the fiber tow is wrapped about the barrier fibers from 3 to 6 times.

7. The tethered flange corner of claim 1 wherein more than one fiber tow is wrapped about the barrier fibers.

8. A flange having a tethered corner comprising:
   at least one ply of barrier fibers comprising a multidirectional fiber preform;
   at least one fiber tow wrapped circumferentially about the barrier fibers to produce the tethered flange corner;
   at least one ply of filler fibers applied over the fiber tow; and
   at least one ply of flange fibers applied over the filler fibers.

9. The flange of claim 8 wherein the flange is selected from the group consisting of end flanges, mounting flanges and combinations thereof.

10. The flange of claim 8 wherein the filler fibers are comprised of a material selected from the group consisting of glass fibers, graphite fibers, carbon fibers, ceramic fibers, aromatic polyamide fibers, and combinations thereof.

11. The flange of claim 8 wherein the flange fibers are comprised of a material selected from the group consisting of glass fibers, graphite fibers, carbon fibers, ceramic fibers, aromatic polyamide fibers, and combinations thereof.

12. An article comprising:
    a composite structure including a flange having a tethered corner comprising:
    at least one ply of barrier fibers comprising a multidirectional fiber preform; and
    at least one fiber tow wrapped circumferentially about the barrier fibers to produce the tethered flange corner.

13. The article of claim 12 wherein the flange is selected from the group consisting of end flanges, mounting flanges and combinations thereof.

14. The article of claim 12 further comprising at least one ply of filler fibers applied over the fiber tow.

15. The article of claim 14 further comprising at least one ply of flange fibers applied over the filler fibers.

16. The article of claim 12 wherein more than one fiber tow is wrapped about the barrier fibers.

17. The article of claim 14 wherein the filler fibers are comprised of a material selected from the group consisting of glass fibers, graphite fibers, carbon fibers, ceramic fibers, aromatic polyamide fibers, and combinations thereof.

18. The article of claim 15 wherein the flange fibers are comprised of a material selected from the group consisting of glass fibers, graphite fibers, carbon fibers, ceramic fibers, aromatic polyamide fibers, and combinations thereof.

19. The article of claim 12 wherein the composite structure is a fan casing.

* * * * *